(12) United States Patent
Shaw et al.

(10) Patent No.: US 9,375,641 B2
(45) Date of Patent: Jun. 28, 2016

(54) SOCIAL MATCHING OF GAME PLAYERS ON-LINE

(75) Inventors: David Shaw, North Bend, WA (US); Paul E. Newson, Duvall, WA (US); Patrick W. O'Kelley, II, Seattle, WA (US); William B. Fulton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2011 days.

(21) Appl. No.: 11/312,781

(22) Filed: Dec. 20, 2005

(65) Prior Publication Data

US 2006/0135264 A1 Jun. 22, 2006

Related U.S. Application Data

(63) Continuation of application No. 11/007,893, filed on Dec. 8, 2004, now Pat. No. 7,677,970.

(51) Int. Cl.
*A63F 13/12* (2006.01)
*A63F 13/30* (2014.01)

(52) U.S. Cl.
CPC .......... *A63F 13/12* (2013.01); *A63F 2300/556* (2013.01); *A63F 2300/5566* (2013.01); *A63F 2300/5586* (2013.01)

(58) Field of Classification Search
CPC ...................................................... A63F 13/12
USPC .................................................... 463/1, 29, 42
See application file for complete search history.

(56) References Cited

U.S. PATENT DOCUMENTS

| | | | |
|---|---|---|---|
| 2,286,257 A | 6/1942 | Richards | |
| 5,586,257 A | 12/1996 | Perlman | |
| 5,813,913 A | 9/1998 | Berner et al. | |
| 6,106,399 A | 8/2000 | Baker et al. | |
| 6,128,660 A | 10/2000 | Grimm et al. | |
| 6,224,486 B1 * | 5/2001 | Walker et al. | 463/42 |
| 6,293,866 B1 * | 9/2001 | Walker et al. | 463/20 |
| 6,322,451 B1 | 11/2001 | Miura | |
| 6,352,479 B1 | 3/2002 | Sparks | |
| 6,425,828 B2 | 7/2002 | Walker et al. | |
| 6,460,036 B1 | 10/2002 | Herz | |
| 6,487,583 B1 * | 11/2002 | Harvey et al. | 709/204 |
| 6,641,481 B1 | 11/2003 | Mai et al. | |
| 6,648,760 B1 | 11/2003 | Nicastro | |
| 6,817,947 B2 | 11/2004 | Tanskanen | |
| 6,821,205 B2 | 11/2004 | Takahashi et al. | |
| 6,905,414 B2 | 6/2005 | Danieli et al. | |
| 7,029,394 B2 | 4/2006 | Leen et al. | |
| 7,056,217 B1 | 6/2006 | Pelkey et al. | |
| 7,069,308 B2 | 6/2006 | Abrams | |
| 7,086,946 B2 * | 8/2006 | Yoshida | 463/23 |
| 7,169,051 B1 * | 1/2007 | Mossbarger | 463/42 |
| 7,311,608 B1 | 12/2007 | Danieli et al. | |
| 7,530,895 B2 | 5/2009 | Kigoshi | |
| 7,614,955 B2 | 11/2009 | Farnham et al. | |
| 7,669,212 B2 | 2/2010 | Alao et al. | |
| 8,066,568 B2 | 11/2011 | O'Kelley, II | |
| 8,221,238 B1 | 7/2012 | Shaw et al. | |
| 2001/0044339 A1 | 11/2001 | Cordero et al. | |
| 2003/0064807 A1 | 4/2003 | Walker et al. | |
| 2003/0093168 A1 | 5/2003 | Nagaoka | |
| 2003/0126613 A1 | 7/2003 | McGuire | |
| 2003/0216962 A1 * | 11/2003 | Heller et al. | 705/14 |
| 2003/0237087 A1 | 12/2003 | Kurapati et al. | |
| 2004/0097287 A1 | 5/2004 | Postrel | |
| 2004/0127289 A1 * | 7/2004 | Davis et al. | 463/42 |
| 2004/0143852 A1 | 7/2004 | Meyers | |
| 2004/0192440 A1 | 9/2004 | Evans et al. | |
| 2005/0181877 A1 | 8/2005 | Kuwahara et al. | |
| 2005/0192097 A1 | 9/2005 | Farnham et al. | |
| 2005/0200077 A1 | 9/2005 | Brian | |

(Continued)

FOREIGN PATENT DOCUMENTS

| | | |
|---|---|---|
| JP | 2002-032319 A | 1/2002 |
| JP | 2002-177640 A | 6/2002 |

(Continued)

OTHER PUBLICATIONS

"On-Line Gaming Session and Party Management", Specification, Application No. Not Yet Assigned.
"Determination of a Reputation of an On-Line Game Player", Specification, Application No. Not Yet Assigned.
Microsoft Case Study, "Innovative online gameplay community serves up 4 million pages per day", http://tech.msn.com/guides/1199615.armx, 2005, pp. 1-7.
"Feedback Forum" from eBay, Feb. 2, 2004, http://web.archive.org/web/20040202054149/http://pages.ebay.com/services/forum/feedback.html>.
"Quake," Wikipedia, The Free Encyclopedia, Feb. 22, 2009, <http://en.wikipedia.org/w/index.php?title=Client-side_Quake&oldid=272432231>.
"Client-side Prediction," Wikipedia, The Free Encyclopedia, Feb. 3, 2009, <http://en.wikipedia.org/w/index.php?title=Client-side_prediction&oldid=268359201>.

(Continued)

*Primary Examiner* — Paul A D'Agostino
*Assistant Examiner* — Ankit Doshi
(74) *Attorney, Agent, or Firm* — Aaron Chatterjee; Judy Yee; Micky Minhas

(57) ABSTRACT

A social matchmaking service selects matches of on-line game players based on personal/social characteristics of the players. The social matching service evaluates several criteria to obtain a list of available, socially compatible, game sessions. Criteria about the player include a player's friends, positive feedback about the player, negative feedback about the player, games completed with other players, players to avoid, and the player's gamer zone, country and language. Criteria about hosts of potentially compatible game sessions are also considered. Social matching utilizes a multi-pass approach, applying rules for prioritizing social criteria at each pass. The multi-pass approach starts with a narrow search and broadens the search at each successive pass. At each successive pass, sessions are added to the list of potential sessions until a reasonable number of sessions is achieved. Game sessions are assigned session values in accordance with affiliations between players.

18 Claims, 14 Drawing Sheets

(56) References Cited

U.S. PATENT DOCUMENTS

| | | | |
|---|---|---|---|
| 2005/0209002 A1* | 9/2005 | Blythe et al. | 463/42 |
| 2005/0251399 A1 | 11/2005 | Agarwal et al. | |
| 2006/0073882 A1 | 4/2006 | Rozkin et al. | |
| 2006/0121990 A1 | 6/2006 | O'Kelley et al. | |
| 2006/0247055 A1* | 11/2006 | O'Kelley et al. | 463/42 |
| 2006/0287096 A1 | 12/2006 | O'Kelley et al. | |
| 2006/0287099 A1 | 12/2006 | Shaw et al. | |

FOREIGN PATENT DOCUMENTS

| | | | |
|---|---|---|---|
| JP | 2002-239251 A | 8/2002 | |
| JP | 2003-47778 A | 2/2003 | |
| JP | 2003-271780 A | 9/2003 | |
| JP | 2003-337874 A | 11/2003 | |
| JP | 2003-340161 A | 12/2003 | |
| JP | 2004-062865 A | 2/2004 | |
| JP | 2004-141525 A | 5/2004 | |
| JP | 2004-298373 A | 10/2004 | |
| JP | 2004-329914 A | 11/2004 | |
| JP | 2003-088677 A | 3/2005 | |
| KR | 2001-0091478 A | 10/2001 | |
| KR | 2003-0037466 A | 5/2003 | |
| RU | 2102790 C1 | 1/1998 | |
| WO | WO 2005/006152 A2 | 1/2005 | |
| WO | WO 2005/006152 A3 | 1/2005 | |
| WO | WO 2006/113809 | 10/2006 | |
| WO | WO 2007/001628 | 1/2007 | |

OTHER PUBLICATIONS

"Unreal Networking Architecture," Epic MegaGames, Inc., Jul. 21, 1999, <http://unreal.epicgames.com/network.htm>.
United States Patent and Trademark Office: Non-Final Office Action dated Oct. 1, 2008, U.S. Appl. No. 11/007,893.
United States Patent and Trademark Office: Non-Final Office Action dated Apr. 28, 2009, U.S. Appl. No. 11/110,017.
United States Patent and Trademark Office: Final Office Action dated Oct. 27, 2009, U.S. Appl. No. 11/110,017.
United States Patent and Trademark Office: Notice of Allowance dated Dec. 3, 2009, U.S. Appl. No. 11/007,893.
United States Patent and Trademark Office: Non-Final Office Action dated Oct. 13, 2009, U.S. Appl. No. 11/313,103.
United States Patent and Trademark Office: Non-Final Office Action dated Nov. 1, 2007, U.S. Appl. No. 11/156,877.
United States Patent and Trademark Office: Final Office Action dated Jul. 9, 2008, U.S. Appl. No. 11/156,877.
United States Patent and Trademark Office: Non-Final Office Action dated Mar. 9, 2009, U.S. Appl. No. 11/156,877.
United States Patent and Trademark Office: Final Office Action dated Nov. 6, 2008, U.S. Appl. No. 11/156,877.
United States Patent and Trademark Office: Non-Final Office Action dated Dec. 11, 2007, U.S. Appl. No. 11/312,959.
United States Patent and Trademark Office: Final Office Action dated Sep. 30, 2008, U.S. Appl. No. 11/312,959.
United States Patent and Trademark Office: Non-Final Office Action dated May 27, 2009, U.S. Appl. No. 11/312,959.
United States Patent and Trademark Office: Final Office Action dated Feb. 2, 2010, U.S. Appl. No. 11/312,959.
U.S. Appl. No. 11/313,103, filed Dec. 20, 2005, Shaw et al.
PCT International Preliminary Report on Patentability issued Oct. 23, 2007, in corresponding International Application No. PCT/US2006/014750.
PCT International Search Report mailed Sep. 27, 2007, in corresponding International Application No. PCT/US2006/014750.
Supplementary European Search Report dated Dec. 3, 2008, in corresponding EP Application No. EP06750723.6.
PCT International Preliminary Report on Patentability issued Dec. 24, 2007, in corresponding International Application No. PCT/US2006/017307.
PCT International Search Report mailed Jul. 30, 2007, in corresponding International Application No. PCT/US2006/017307.
"Terra Nova : Reputation", Tera Nova Blog, http://terranova.blogs.com/terra_nova/2003/12/reputation.html, accessed Apr. 6, 2010, 41 pages.
EP Application No. 06750723.6 : Extended European Search Report, Dec. 3, 2008, 5 pages.
Heeter, "BattleTech Masters: Emergence of the First U.S. Virtual Reality SubCulture", Multimedia Review, Jan. 1993, 9 pages.
Xiong et al., "A Reputation-Based Trust Model for Peer-to-Peer eCommerce Communities", IEEE International Conference on E-Commerce Technology (CEC'03), Jun. 24-27, 2003, 12 pages.
United States Patent and Trademark Office, Non-final Office Action dated Apr. 13, 2010, U.S. Appl. No. 11/110,017.
United States Patent and Trademark Office, Notice of Allowability dated Jul. 13, 2011, U.S. Appl. No. 11/110,017.
United States Patent and Trademark Office, Non-final Office Action dated Apr. 29, 2010, U.S. Appl. No. 11/313,103.
United States Patent and Trademark Office, Final Office Action dated Sep. 24, 2010, 2011, U.S. Appl. No. 11/313,103.
United States Patent and Trademark Office, Notice of Allowability dated Oct. 24, 2011, U.S. Appl. No. 11/313,103.
Quake III Arena (user's manual), 1999, Id Software.
Screenshot of "Arena Servers" page from Quake III Arena, downloaded Oct. 26, 2012, available at <http://imageshack.us/photo/myimages/133/q3servershf6.jpg/>.
GibStats Quake Analysis Tool and Screenshots, downloaded Oct. 26, 2012, available at <http://www.quakewiki.net/archives/gibstats/screenshots.html>.
Screenshot of "GibStats II Welcome" screen showing release date of latest version (0.99) of GibStats III, downloaded on Oct. 26, 2012, available at <http://www.quakewiki.net/archives/gibstats/index-2.html>.
Custom Server Settings: OSP Tourney DM—Quake 3, Feb. 23, 2003, OrangeSmoothie.org, available at <http:/ /static. hug i. is/games/quake3/osp/Docs/osp-q3-Variables. txt>.
United States Patent and Trademark Office: Non-Final Office Action dated Jun. 20, 2011, U.S. Appl. No. 11/312,959, 25 pages.
United States Patent and Trademark Office: Final Office Action dated Nov. 23, 2011, U.S. Appl. No. 11/312,959, 24 pages.

* cited by examiner

FIG. 15

| Friend | A player adds a person to Friend list |
|---|---|
| Positive Feedback | Player has submitted positive comments about person |
| Completed Game | Player has previously completed a game with a person |
| Negative Feedback | Player has submitted negative comments about person |
| Avoiding Me | Person has submitted negative comments about player |
| ... | ... |

$$\text{Session Value} = \left\{ \begin{array}{l} + W1 \times \text{"Friends"} \\ + W2 \times \text{"Positive Feedback"} \\ + W3 \times \text{"Completed Games"} \\ - W4 \times \text{"Negative Feedback"} \\ - W5 \times \text{"Avoiding Me"} \end{array} \right. \cdots$$

1600

SOCIAL MATCHING OF GAME PLAYERS ON-LINE

CROSS-REFERENCE TO RELATED APPLICATIONS

This application is a continuation-in-part of U.S. patent application Ser. No. 11/007,893, filed Dec. 8, 2004, titled "SYSTEM AND METHOD FOR SOCIAL MATCHING OF GAME PLAYERS ON-LINE," the disclosure of which is hereby incorporated by reference in its entirety.

TECHNICAL FIELD

The technical field generally relates to the field of gaming and multimedia devices. In particular, the technical field is directed to a method of socially matching users who want to play a common game application.

BACKGROUND

In online gaming, game hosting services and game developers have created a number of ways to track and personalize the online gaming experience. One drawback of existing systems is that many of the features have grown up independent of each other. Games send blobs of data about gamers back and forth to a central service, but the service has no way to understand and aggregate the data outside of the game context. Games can host their own Websites, but the data displayed there is not universally accessible to other games.

In a sense, then, the service and games offer two parallel communities that offer great—but separated—resources for gamers. First, in the game community, while playing a game, the gamer can see the community of others who play the specific game, the leaderboards for that game, and his personal achievements in that game. A game can tell a gamer, from the Service data, if a Friend is online, but it can't tell the gamer what, exactly that Friend is doing on the Service or when he will be available.

Second, in the service community, the service knows a gamer player's history, all of the games he's played, the amount of time he spends online, the size of his Friends list and all of the games that Friends have played or are playing, the Friends invites sent and received, the Messages sent and received, and all of the Feedback the gamer has given and received.

Systems have tried to leverage these on-line communities to match various players to allow them to play multi-player games. Nevertheless, in general such systems, which typically emphasize skill or experience in a single game or small family of games, do not group players who are likely to enjoy shared interaction based on social and/or personal considerations. That's because these social factors, which depend on large aggregates of data across many game types and session, cannot easily be taken into account when matching players for a single game. Matchmaking systems in the gaming world do not produce close relationships between individual players.

There is a need for a matchmaking service that selects matches based on personal/social characteristics that emerge from cross-game data collection. Moreover, such systems should take into account direct feedback from other players about positive and negative experiences with a particular player and expectations about appropriate conduct and type of game being played before a player joins the game session. Such a system, it is believed, will result in deeper interpersonal relationships and more enjoyable game play, because the frequency and quality of interaction with suitable players is increased over time as a player's network of familiar players grows.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter. Social matching of game players on-line comprises a Social Matchmaking system that connects people for the primary (though not exclusive) purpose of playing online, multi-player games via a specialized, socially-oriented set of algorithms. The Social Match system involves two or more players connected to an online gaming service where the game, service, and players themselves provide data about the players' social behavior. The data used by the Social Match system includes the players' specifying a behavioral "zone" that describes their preferred type of gaming environment (competitive v. more casual), and it also keys off of players' reputations (calculated from feedback submitted about players to the online service). This data can be used to find Matches by querying and comparing the reputation and zone of players.

The Social Match system also includes priority Matching with Affiliates. Affiliates include people a gamer has explicitly designated as friends or people on whom a player has given positive feedback. Affiliates also include (as a lower priority) people who a player has played with in the past. Social matching is accomplished via the utilization of a feedback loop, accounting for social attributes and balancing the results while prioritizing any specified social criteria. Social matching uses a multi-pass approach with rules for peeling away potential match candidates at each pass. Accordingly, the population sample of available matches is dynamically adjusted.

BRIEF DESCRIPTION OF THE DRAWINGS

The foregoing summary, as well as the following detailed description, is better understood when read in conjunction with the appended drawings. For the purpose of illustrating social matching of game players on-line, there is shown in the drawings exemplary constructions thereof; however, social matching of game players on-line is not limited to the specific methods and instrumentalities disclosed. In the drawings:

FIG. 15 is a list of exemplary affiliations; and

FIG. 16 is a depiction of an exemplary calculation of a session value.

DETAILED DESCRIPTION OF ILLUSTRATIVE EMBODIMENTS

Figure 1:
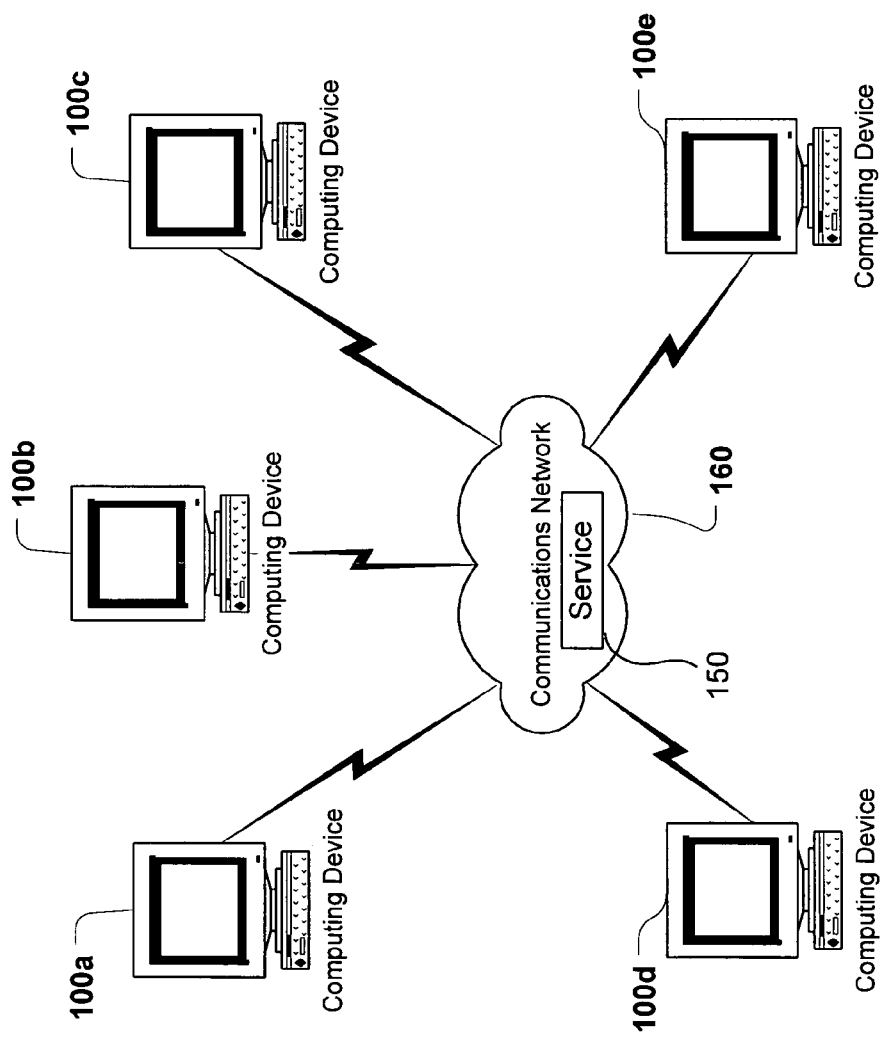
FIG. 1 is a block diagram of an exemplary computer network environment in which aspects of social matching of game players on-line can be implemented.

FIG. 1 is diagram of an exemplary computer network that serves to illustrate aspects of social matching of game players on-line. Here computers 100a-100e may host various ones of the computing objects such as games and other applications. Although the physical environment shows the connected devices as computers, such illustration is merely exemplary and may comprise various digital devices such as PDAs, game consoles, etc. Moreover, communications network 160 may itself comprise a number of computers, servers and network devices such as routers and the like.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of social matching of game players on-line could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 10a-10e. Moreover, communication network 160 may comprise wireless, wireline, or combination wireless and wireline connections. Additionally, the computer network may comprises a distributed computing environment. In such an environment a computing task may be spread over a number of computing devices that are addressable elements in a computer network.

According to an aspect of social matching of game players on-line, communication network 160 may host a service 150 that is accessible from the plurality of computers 100a-100e. The service 150 gathers information and tracks users of computers 100a-100e to provide computing services for all of the users of the service.

Figure 2:
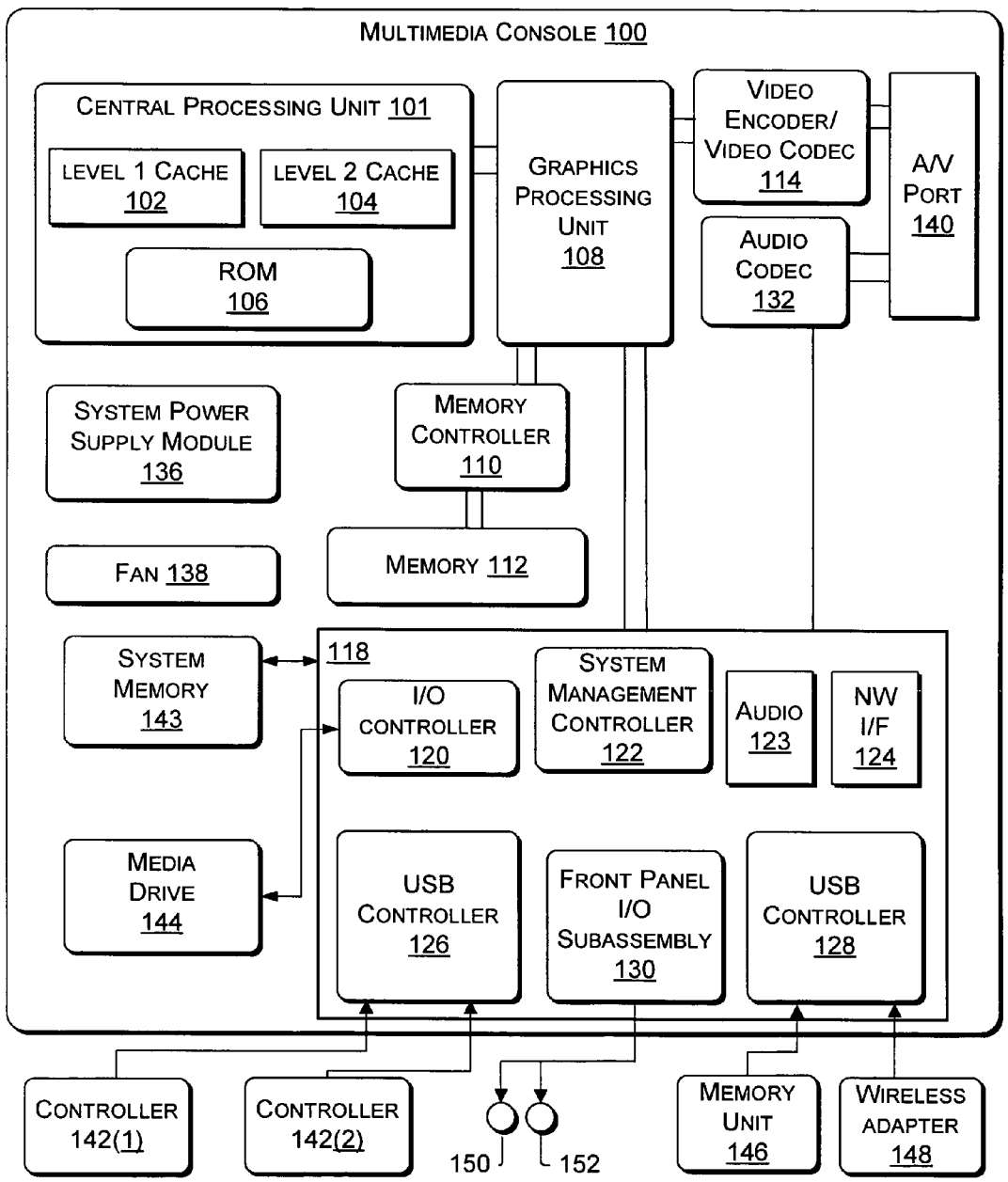
FIG. 2 is a block diagram illustrating an exemplary console that can be incorporated into a network computing environment such as the network computing environment of FIG. 1.

FIG. 2 illustrates the functional components of a multimedia/gaming console 100 that may be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in the larger network community as illustrated in FIG. 1.

According to an aspect of social matching of game players on-line, when a game is executed on console 100, it provides information to a service operating on communications network 160. The service tracks the information for all of the users connected to the service to provide a rich user experience. The service tracks user information across games, consoles, computing devices, etc. By tracking the information for all users of the service, the service can aggregate statistics for all users and measure game playing ability, provide a richer user experience by providing information about friends (e.g., what game they are playing and what skill level they have attained), track user achievements and generally measure statistics for a game aggregated over a large user community.

In order to provide a consistent data set across games, the system contemplates a schematized, configuration driven process where each game generates a configuration file (according the schema defined by the service) that defines the game data for a particular game. Through a game configuration process, games describe the data the game generates about each game player. By using the configuration process, the service will be able to understand the data as it flows from the game, and it will be able to integrate it in meaningful ways with the other data that the service understands to create a rich profile of each user of the service. The profile will follow the user wherever he goes on the service, i.e. it is game and location independent.

For each user, the service will collect a number of pieces of data (called Profile Data) to build the user profile in every game session—and even after a game session is concluded. In general, the pieces of the service experience that feed profile include:

1. What the user says about himself or herself (including account set up and the construction of an elaborate personal profile, including the preferred social gameplay "zone").
2. What others say about the user (feedback scores and a publicly visible reputation).
3. What the games say about the user (game configuration and integration of data that comes out of game play to compute a player's skill, among other things).
4. What the system says about the user (time online, aggregates of games played, Friends list, console behavior etc.)

The system creates a "User Profile," which serves as a building block for services and applications that aim to create a social community of gamers and grow relationships among players. The User Profile is the entirety of information (e.g., metadata) related to a specific user (i.e., the game player's digital identity). The User Profile is developed from a set of services that collect and expose this information in a meaningful way to the community. The User Profile also provides for personalization such that users can customize and enhance their gaming experience. As will be discussed in greater detail below, the User Profile consists of various components, including, but not limited to, a Gamercard, game achievements, and gamer preferences.

Figure 3:
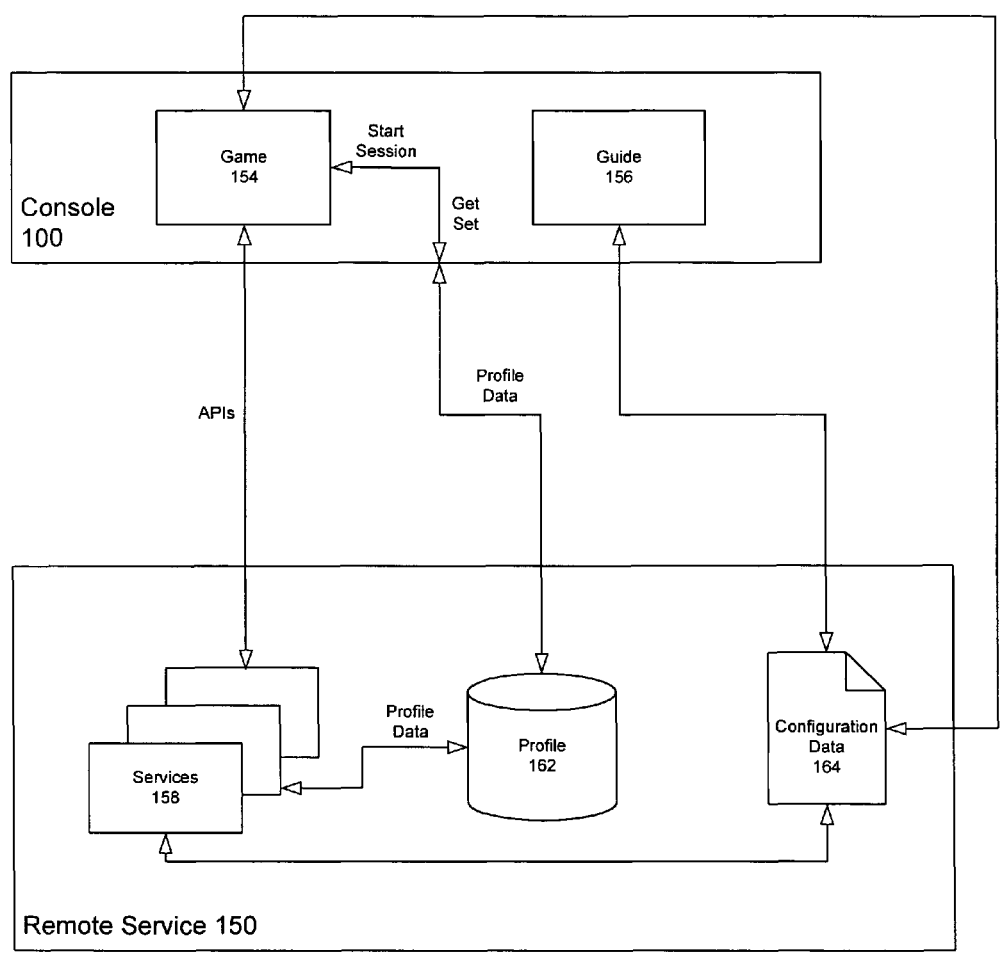
FIG. 3 is a block diagram illustrating the interaction of a console with the remote service.

Referring to FIG. 3, there is illustrated an overview of an exemplary architecture that may be used to implement the User Profile interaction as well as user interaction with the matchmaking service described more fully herein. The console 100 interacts with a remote service 150 that provides services 158 such as voice/chat, a friends list, matchmaking, content download, roaming, feedback, tournaments, voice messaging, and updates to gamers. The service 150 also maintains the User Profiles in a profile database 162 and configuration data 164 used by the services 158 and games 154. The service 150 collects User Profiles, aggregates, processes information supplied by other services 158, and fulfills real-time client requests for retrieving User Profile-related services. The User Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. The configuration data 164 stored by the service 150 may be used to determine features and options provided by the guide 156. When the game 154 is running, a defined set of APIs (including SetContext, SetProperty, SetAchievement, and Session APIs for writing data about players, and a number of specialized read APIs for viewing stats, achievements, and other User Profile data) are used to call and interact with the services 158. When requesting User Profile information via the APIs, the game 154 may pass a unique identifier of a user. The service 150 may return a Gamercard (discussed below), game stats, game achievements, affiliations, game settings. etc. Additional details of the various aspects of the exemplary architecture are provided below.

Service 158 assists in tracking and displaying a wide-variety of in-game stats, such as number of points, best lap times, and (importantly, for calculating the skill value needed in Matchmaking) win/loss. All stats are provided by the various games that a user plays and provided to the service for inclusion in a user's User Profile. For example, a first-person shooter title may want to define a 'Points' Property to be tracked independently for each 'Map' Context (e.g. 5 Points on Blood Creek vs. 10 Points on Battle Range). That information could be displayed as:

| "PER-MAP POINTS" | |
|---|---|
| Map | Points |
| Blood Creek | 5 |
| Battle Range | 10 |

Each game should support a minimal set of information that match the character of the game and which can be tracked for each user of the service 158.

Service 158 takes a different approach to tracking player achievement stats by emphasizing individual progress and accomplishments (e.g. a trophy case) over global ranking against the entire population of players. Achievements are intended to track check-point completion, advancing to a new skill level, hitting a career milestone, earning/unlocking new content, placing in service events, such as tournaments and/or any notable in-game events.

Each Achievement consists of a unique ID, Description, Rank, an optional Image and additional metadata. Optionally, an Achievement can be associated with a number of Experience Points. For example, each title will give out Experience Points to each player based on in-game progress and accomplishments. Beyond the intrinsic satisfaction of collecting Experience Points, the most accomplished users can receive extrinsic awards from the service.

Figure 4:
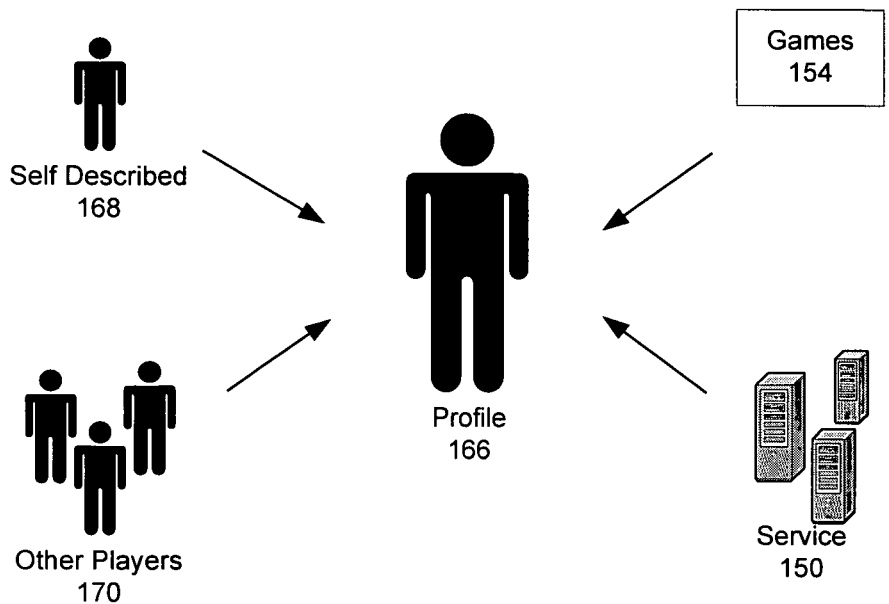
FIG. 4 illustrates the information gathered to build a user profile.

Referring to FIG. 4, the User Profile 166 is created when a user creates a profile (selected from the guide 156) and chooses his/her unique Gamertag (a user's unique name), tile (picture/avatar associated with the user) other options during an account sign-up phase. From there, a base User Profile 166 is created. The User Profile 166 may then be populated from several sources. For example, the User Profile 166 may include self-described data 168 from the User Profile owner. Other gamers 170 can provide feedback regarding the User Profile owner. The service 150 may track the user's online and offline activity. In addition, the games 154 may report the user's statistics and game achievements.

The owner of User Profile 166 can edit his/her User Profile 166 directly and control who can view each section of the User Profile. The User Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the User Profile 166 to, e.g., restrict presence information only to friends, allow game achievements to be visible to all, etc.

The User Profile 166 may include feedback provided by other players 170. Feedback helps others learn about a particular gamer. For example, if the gamer uses foul language or aggressive play in game sessions, other gamers may submit feedback to the service 150. The feedback mechanism improves the user experience by building reputations. Players are therefore anonymous, but not unknown because of the accumulated feedback.

In another aspect of the system, the service 150 and games 154 track online and offline activity of users to provide usage statistics in the Gamer Profile 166. When a gamer plays online, a particular game title is added to list of games played that is made visible to others. While offline, the game console 100 and game 154 track the user's activity via a mechanism for instrumenting games to collect detailed information about a specific player's in-game statistics and accomplishments.

The Gamer Profile 166 is updated during the next connection to the service 150 to reflect the offline play. Game achievements may be reported to the service 154 by games via the User Profile data mechanism.

Referring to FIG. 5 through FIG. 8, the Gamer Profile can be viewed in a number of ways and forms, and is typically displayed in the Gamercard 172. The Gamercard 172 is the visual representation of the Gamer Profile 166 that is available to games on the console 100 and, e.g., the web. The Gamercard 172 serves as a summary or snapshot of a player's Gamer Profile 166. Gamers may use the Gamercard to set up a matchmaking list where gamers are added to a preferred players list to play again in the future.

Figure 5:
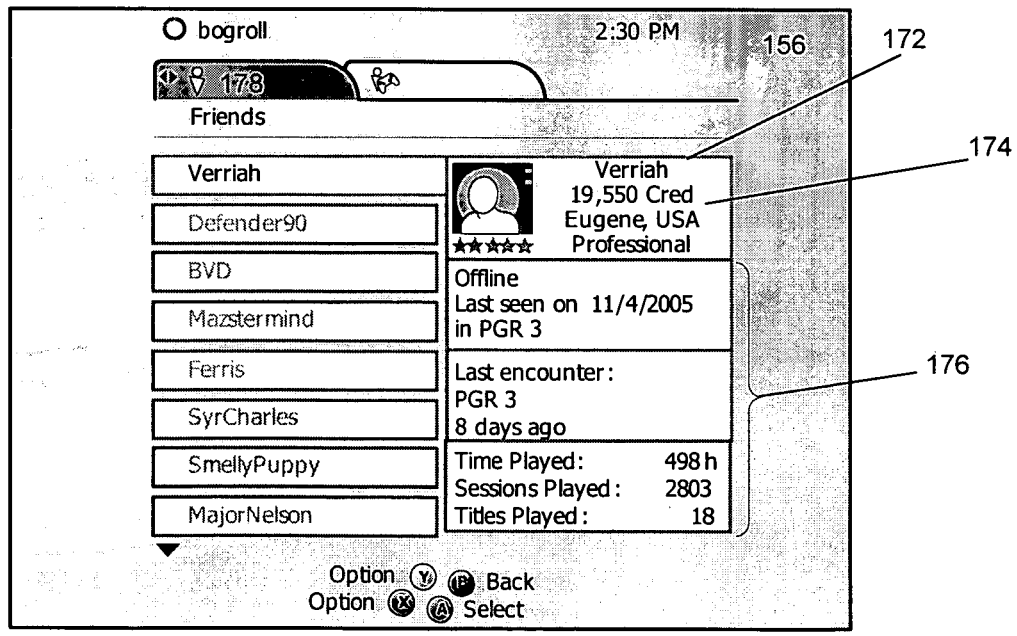
FIG. 5-8 are example illustrations of a user interface displaying user profile information.

As shown in FIG. 5, the Gamercard 172 may be divided into two regions, a base area 174 and a context-specific (or extended) area 176. The base area 174 provides a set of Gamer Profile information in a standard and consistent way across multiple contexts, whereas the extended area 176 may be customized to fit a specific context. Although the Gamercard 172 of FIG. 5 through FIG. 8 are shown in the context of the guide 156, the Gamercard 172 may be visually separated from the rest of the screen and adopt the background color of the screen it is displayed on. In addition, the Gamercard 172 may be temporarily replaced by an animation while it is being loaded for viewing.

The base area 174 may be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating, gamer Cred (a points-based reward points system, also referred to as gamerscore), gamer zone, country, membership tier, awards, etc. An offline Gamercard 172 is shown when a player is looking at his/her own Gamercard 172. The offline base area 174 may include a subset of the online base area and may further include information regarding titles played and time played. The base area 174 of a Gamercard 172 is preferably fixed in size, has a consistent, static layout and has a fixed placement of all information elements, such as Tile or Gamer Cred.

Figure 6:
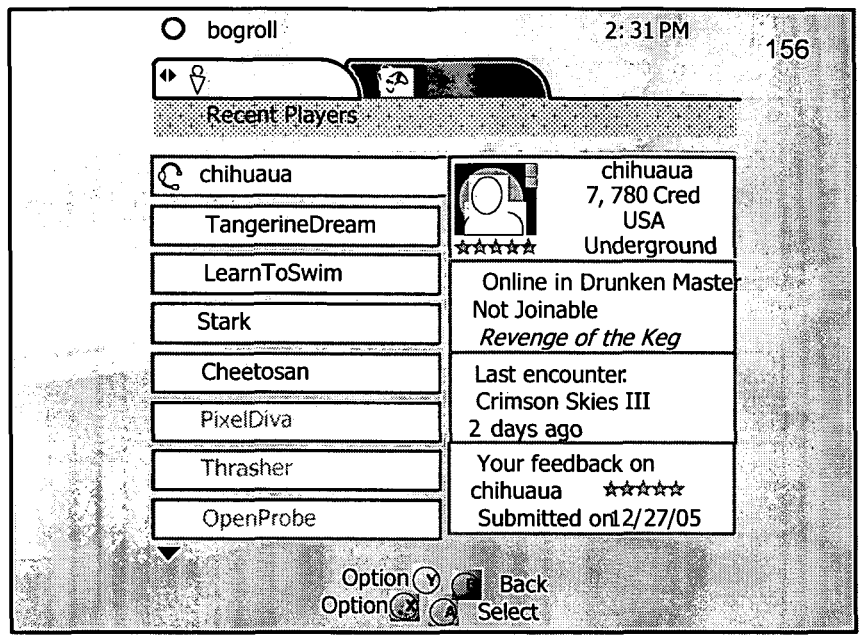
Figure 7:
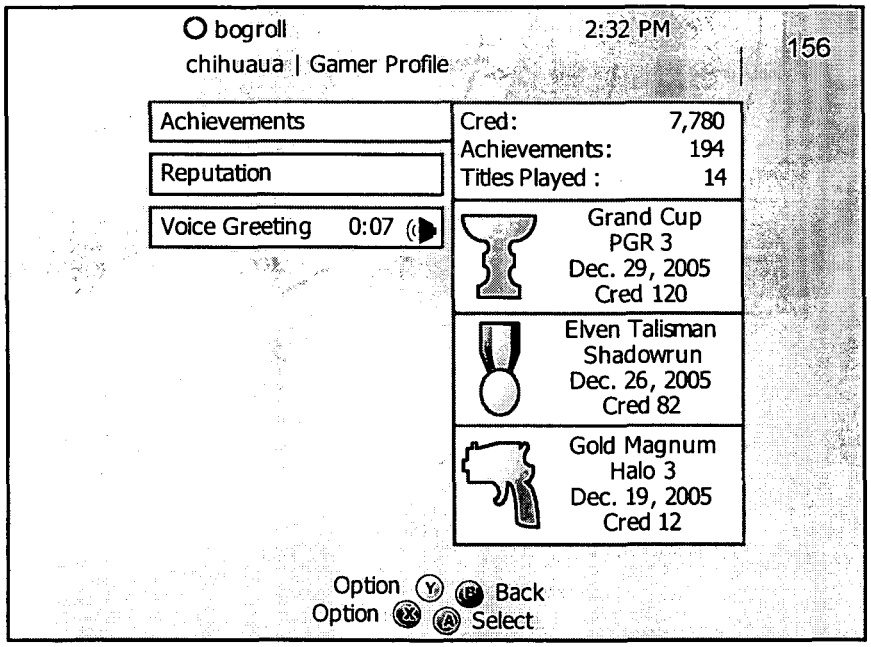

The extended area 176 may include a set of Gamercard Actions, such as "View Profile" and "Send Feedback," etc. The extended area of the Gamercards is preferably not fixed in size, because it may vary based on the context. As shown in FIG. 5 through FIG. 7 a user may scroll through the list of other users via the guide 156 and a friends list 178. The Gamercard for other users may be displayed as the user scrolls among his/her friends or the user may be presented with an option to see a full view of the Gamer Profile. The full view mode consists of different views of the extended area 176 and may include several sections, such as a Profile Summary, Community Feedback, Game Achievements, Activity, and Social Network. The guide 156 may advance through the list of friends, recent players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Matchmaking and Session:

For online, multi-player games, Matchmaking connects a game player to a session. A Match made session is an instance of game play that includes 2 or more gamers playing a game until they either decide to terminate the session or until the session meets its end criteria (as defined by the game). The person who creates the session is the host. Some games are hostless, meaning that the game does not assign any special function to the person who originated the game. In such a case, the originator may, in fact, be a person who was searching for a session with specific criteria and, when it was not found, the game created a session for the person and advertised it for others to match into it. Matchmaking involves joining a session that has, as a minimum, one player already in place. A session is said to be joinable if there are open slots available to the person seeking a slot and the game play has not yet begun (the game is in "lobby" state). Some games that have join in progress sessions will advertise that a session is joinable until every public slot is filled. A gamer makes a Match by selecting "Matchmaking" in a game or in an out-of-game Matchmaking system. The Matchmaking UI may allow a gamer to add some filters to his search for a session (e.g. like specifying a map or difficulty level), or it may push a gamer directly into a search query. In most cases, with or without filters, a gamer is given a session search result which consists of a list of sessions. Each session is defined by a session descriptor that includes a short summary the most salient information about that session. A gamer then selects a session and joins it. Typically, a player then enters a lobby and awaits other players to match into the game before game play begins. In some cases, no search result is shown, and players are dropped instead directly in the lobby of the game that best meets their search criteria.

Social Matchmaking:

When a game player chooses to Matchmake into a session, in the first session, the profile data he has set describing himself is used to "prime the pump" and find the best fellow new gamers to play with. Just by playing, the game player associates with a group of fellow gamers who become "Recent Players" on the Affiliates List. The service preferably prioritizes playing with Recent Players over strangers in future session, but once a game player gives positive feedback, these "positive feedback" people are remembered by the system and are given even higher priority. Over time, as a gamer becomes very familiar with a set of players, he invites them to become friends. These friend gamers are given the highest priority.

This Matchmaking system will connect people who have similar intent and who share a similar profile to insure that they all have a good time, in and out of game play (but primarily in game play). Matchmaking—with its use feedback and profile data—facilitates people expanding and refreshing their online community with increasingly refined matches over time. Ultimately, Matchmaking will bind people to the service as a safe, secure place to meet new people and create a history of positive experiences.

Details on Query-Based Social Matching on User Profile:

Several of the aspects of User Profile that surface in a Gamer Card can be used to match a game player to a session. At a high level, according to an aspect of social matching of game players on-line when a game player signs up in the service 150, he is asked to select a Gamer Zone that best describes the kind of social environment he prefers to play in. The Gamer Zone is indicative of a range of socially acceptable game sessions. Before the service has other profile data to use, this Gamer Zone is used to match the game player with other players who have selected the same Zone. In general, attributes of the members in a session are combined to form a session value and the session value is compared with the player's Gamer Zone. This comparison can be accomplished in any appropriate manner. Examples of how this comparison can be accomplished include comparing the player's Gamer Zone with the Gamer Zone of the host of a session; performing a database query looking for Social sessions that contain a majority of players with the same, or approximately the same, Gamer Zone; averaging the ratings of all players in a session to create a session rating and compare the session rating with the player's Gamer Zone; comparing the player's Gamer Zone with a session value within a statistical tolerance; or any combination thereof.

As time goes on and the service has additional data about each player, this Match query can be improved by averaging multiple key aspects of User Profile (still the Zone, but as time goes on, also feedback reputation, skill computed via stats, and his experience defined by Achievements achieved) for each participant in a session. The system then can provide a session "profile" that can be compared with the User Profile of a player seeking a match. The match system can then query this session profile by comparing it to the values in a User Profile of an individual who wishes to join the session. If the match of the User Profile is sufficiently close to the session profile values (sharing the same Zone and within a pre-specified range for each of the numeric values for reputation, skill, and experience), then the user will be shown that session as a Match. If the match comparison is not within the pre-specified ranges, then the user's query will continue on to compare to other sessions' session profiles until a positive result is achieved. For example, NAT type, physical proximity to other players, time played on the system, and/or games played can be folded in on the back end when a Match search is performed.

Details on Social Matchmaking by Network of Affiliates:

In addition to Matchmaking based on a query with User Profile, the Social Matchmaking system, in conjunction with the tracking of friends, recent players, and feedback on recent players, builds a network of Affiliates who are prioritized for Match.

The Affiliates list is a prioritized list of people for a player that includes (1) Friends (i.e. people who the player has invited, and who have accepted the invitation, to a preferred social network that allows exchange of messages and state information), (2) Positive Feedback people (i.e. people about whom the player has given positive feedback), and (3) Recent Players. The Social Matchmaking service always looks first (before conducting the query above) for the presence of Affiliate sessions on the service. If any person on a player's Affiliates list is online and in a joinable session, the service will return that session. If there are multiple Affiliate sessions, the ones with Friends are given priority over those with Positive Feedback People or those with Recent Players. Positive Feedback People are given priority over Recent Players.

In accordance with the above, FIG. 6 illustrates a list of Recent Players in the guide 156. A person is added to a player's Recent Players list when the player has played an online game session with the person. The Gamercard displayed when browsing recent players shows the base area and an extended area that provides information regarding recent games, feedback, and presence of the recent players. FIG. 7 illustrate further details that may be obtained about recent players, such as general achievements.

Figure 8:
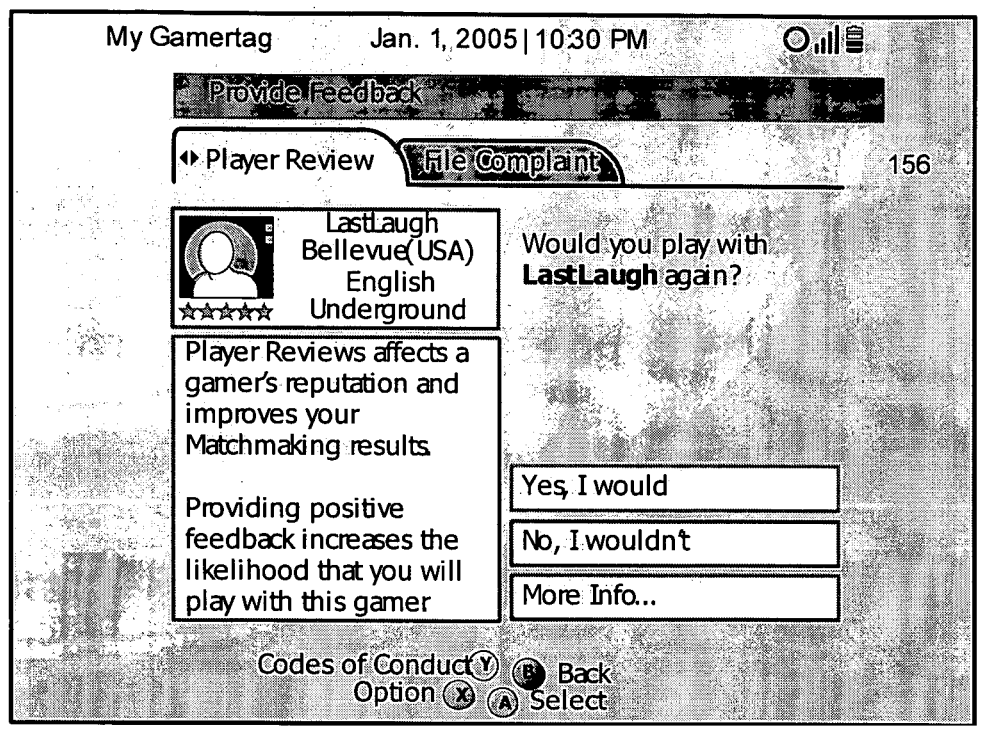

Importantly, FIG. 8 illustrates a feedback mechanism whereby a game player can provide feedback on other game players. This feedback options is only available on a Gamer Card when the viewing player has played with the person before. This feedback information is then used to improve matchmaking results, i.e., indicates whether or not you would want to play with this game player in future games. By giving positive feedback on a person, that person moves up in priority in that player's Affiliates list. Moreover, the feedback affects the game player's reputation and may change the group of players with which the player is group in future games.

Feedback is, then, for the purposes of Matchmaking, the creation of a "one-way" friends list, i.e., a low threshold mechanism to build a list of people you meet again and again. This mechanism is generally invisible except as an improved matchmaking experience. For example, when a game player indicates that he would like to play with a particular person again, the system tracks that information in a on-way friend list so that the other player doesn't have to be invited or accept an invitation to be on a friends list.

If a player gives negative feedback on a person, that person moves to an "Avoid" list, and for the purposes of Social Matchmaking, all future sessions containing that person will be avoided for the player.

Figure 9:
FIGS. 9-12 illustrates a user interface whereby a user can initiate a matchmaking.
Figure 10:
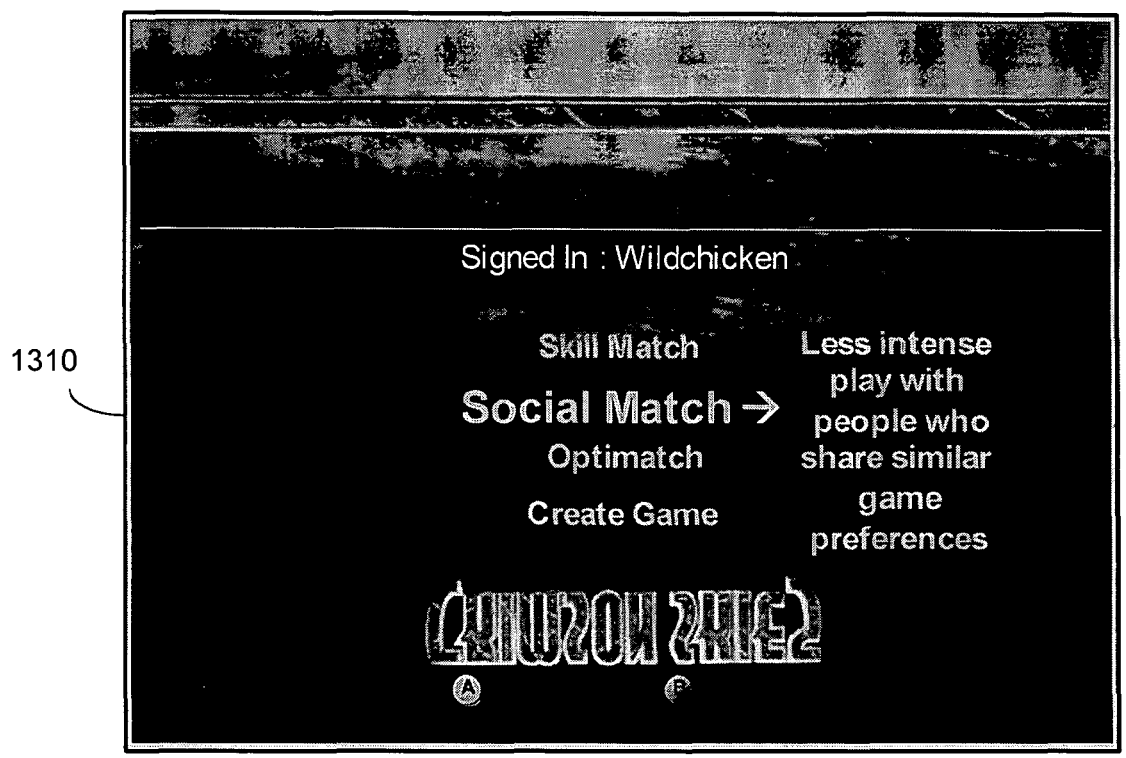
Figure 11:
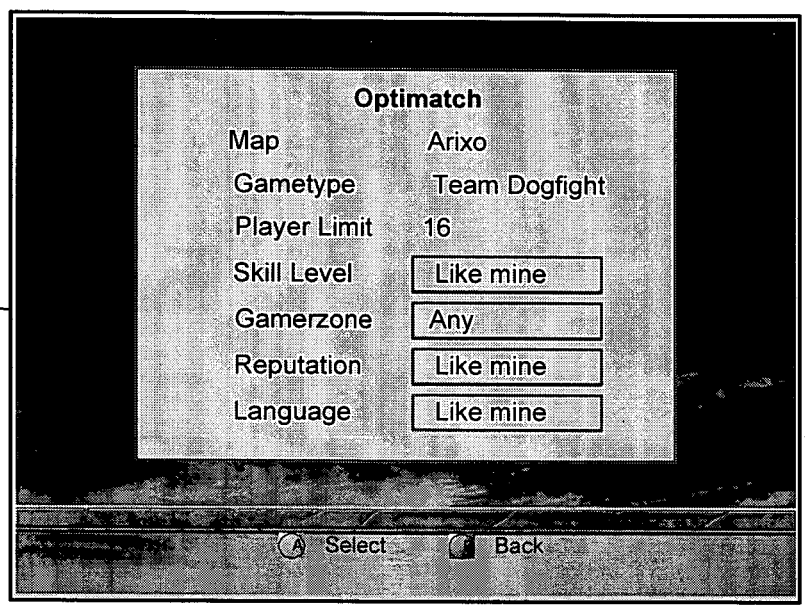
Figure 12:
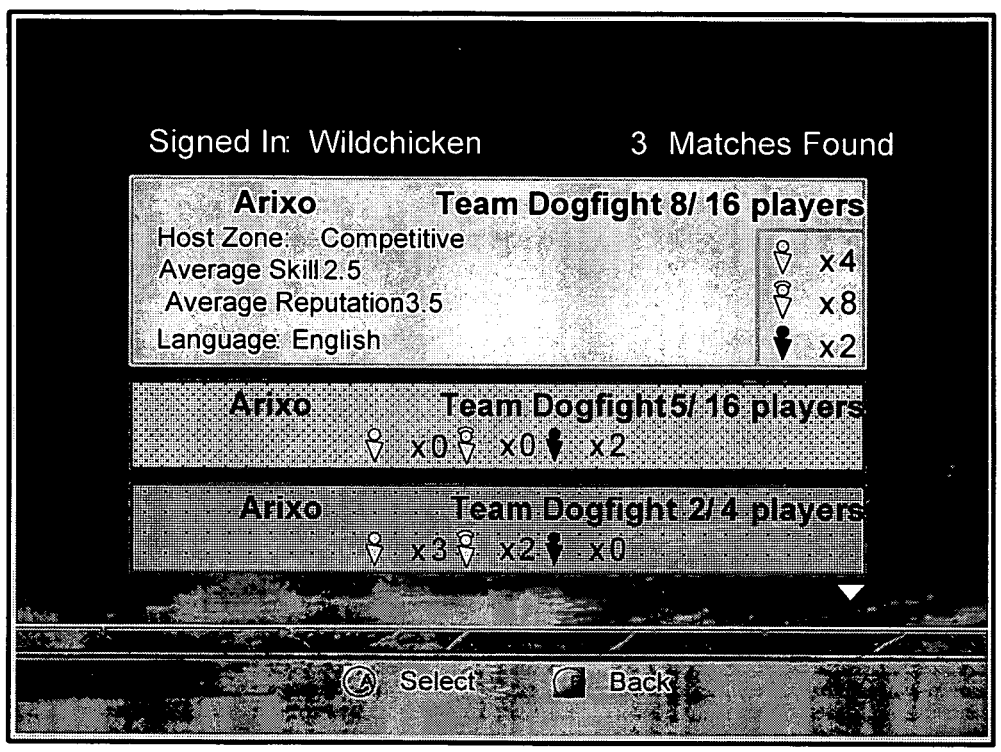

Session Descriptor in Social Match Query Results Defined:

For query results, all games provide per-genre, per-game-mode session descriptor that contains a summary of key User Profile averages for the session, a summary of the major game settings, and a "Session Label" that identifies the type of game play in the session (defined by the "Zone" of the players in the game). This data helps a player get an "at-a-glance" view of each session so that he can pick the best one to join. Examples of the types of data that can be included in the session descriptor include:

Game name
Host's name
Community reputation rating of the players in the game
Atmosphere or rules of the game (e.g., use of mature language, level of competitiveness)
Game settings (e.g., type of game, level or track being played)
Connection speed (i.e., ping)
Skill level of the players in the game
Whether there are friends of yours in the game
Whether there are friends of your friends in the game
Whether there are people you have enjoyed playing with previously in the game
Language spoken in the game
The country game is being hosted in Social Matchmaking Interface:

FIG. 9 illustrates a user interface 1310 whereby a user can select the type of interaction desired for a particular game. Here for example, the user has selected from within the CRIMSON SKIES game that he wants to play a skill match with game player of equal or higher skill level. This is not a Social Match. FIG. 10 illustrates a similar user interface 1310 wherein the user has selected the option of playing a Social Match. Additionally, the user has the option of selecting an Optimatch (also referred to as Custom Match), wherein the user selects the specific game criteria or options to use in the selection process. As shown in FIG. 11, when a user selects Optimatch he can specify whether or not he wishes the service to take into account his skill level, gamer zone (e.g., competitive or social), reputation, or language when conducting the Match. This feature allows the player to optimize the Social search criteria according to personal preference. In an exemplary embodiment, a player may not, however, specify that he wishes to search for sessions skewed far from his own settings. In the case of reputation, for example, it would be unfair to let a low reputation player single-out high reputation people to play with. FIG. 12 illustrates three matches that meet the criteria specified by the user (a similar display would be presented for any one of the above selected match options). The icons with the x4, x8, x2 next to them represent the number of Affiliates in each session.

Figure 13:
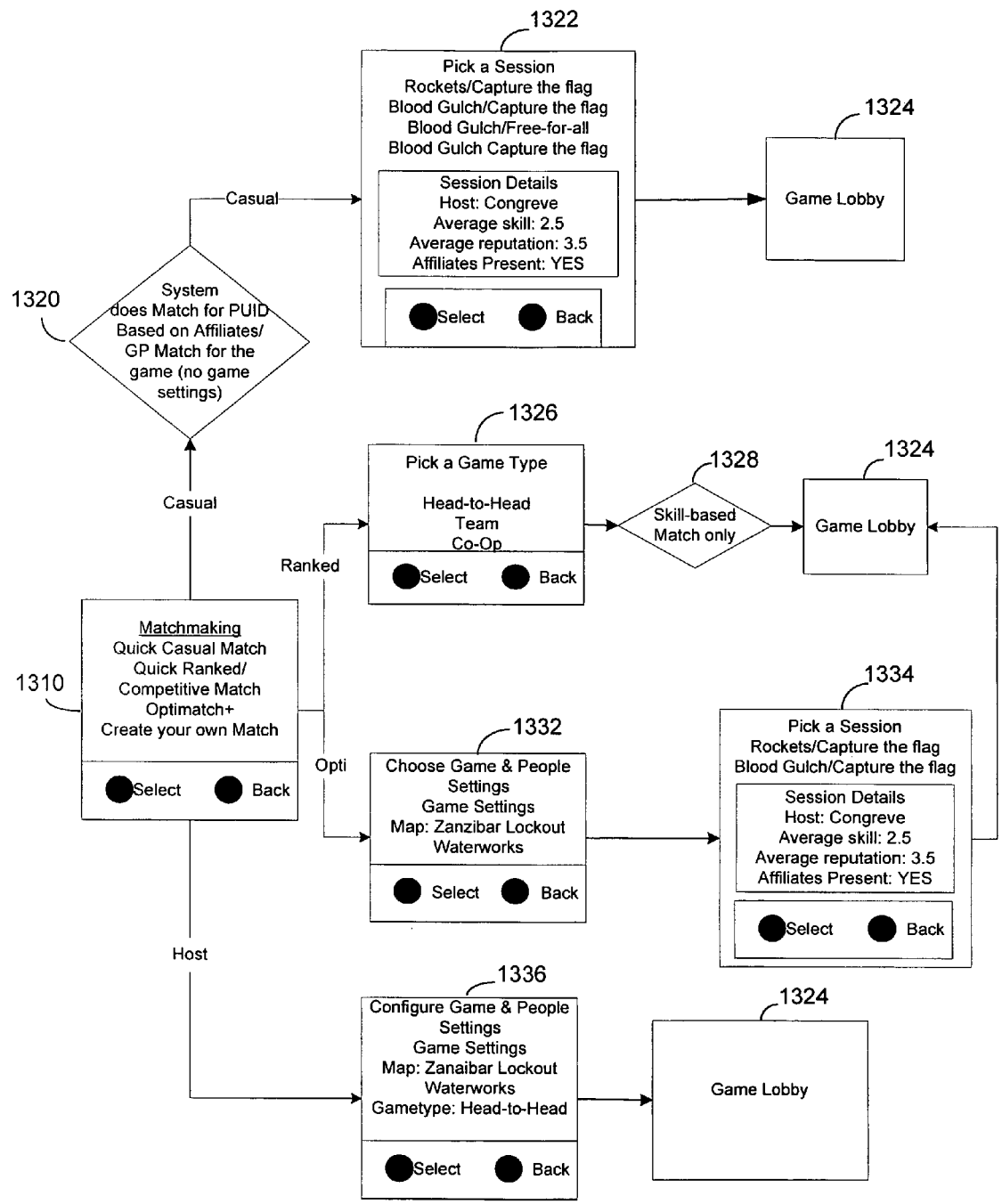
FIG. 13 illustrates a flow chart of exemplary matchmaking options.

FIG. 13 provides an overall flow chart that illustrates the flow of the UI option for matching that are selectable by a user. Initially, at screen 1310 (which parallels the image show in FIGS. 9 and 10), the user is presented with a variety of matchmaking options. The user could simply select the option of playing a "casual" Social game and letting the system provide the matching set of game players at step 1320 and as described above. In that instance, a set of user would be selected based on affiliates, most recently played, etc. Thereafter, the user would be presented with a screen 1322 containing a variety of session that matched. After the user selects one of the sessions, he would go to lobby 1324 and wait for the game session to be started.

Similarly, at screen 1310, the user could select a ranked or skill-based game and move to screen 1326. At that screen, the user would then select whether the game should be head-to-head, team, etc. That would allow only skill based players at step 1328 to enter the lobby 1324 to wait for the game session to be started. Alternatively, the user could select the option matching from the main screen 1310 and go to screen 1332 to enter match options. Thereafter, a set of matching game session would be presented at screen 1334 from which the user could select and again go to lobby 1324.

Additionally, the user could instead of joining a session created by another user, elect to host a game session by specifying the criteria for joining the session as indicated by screen 1336. Thereafter, the user would wait in the lobby for other users that joined the game session, e.g., by selecting the proper criteria from the matchmaking system.

Social matching attempts to increase the probability of placing people in sessions with people they prefer, and decrease the probability of placing them in session with people they would rather not play with. Social matching utilizes a multi-pass approach, applying rules for prioritizing social criteria at each pass. The multi-pass approach starts with a narrow search and broadens the search at each successive pass. At each successive pass, matches (sessions) are added to the list of potential sessions until a reasonable number of sessions is achieved. In this manner, the population sample of sessions is dynamically adjusted.

Social matching is applicable to users who are in a mood in which winning and losing are less important than finding a session filled with people they enjoy playing with. Social matching evaluates several criteria to obtain a list of available, socially compatible, sessions. These criteria include: the user's friends list, who has the user submitted positive feedback on, who has the user completed games with in the past, who has the user submitted negative feedback on, who has submitted negative feedback on the user, the user's selected gamer zone, the host's selected gamer zone, the user's gamer rating (a social rating), the host's gamer rating, the user's selected country, the host's selected country, the user's selected language, and the host's selected language. Any combination of these criteria can be used to determine if a session and a player are compatible. Gamer rating is a community visible representation of the player's social reputation on the service. Gamer rating (also referred to as Rep) is driven by games played with new players and by the feedback generated (or lack of feedback) about the player during these games. If a player plays with new people and gets no negative feedback, the system sees the player as behaving well and ages (lessens the value) of any negative feedback that the player has received previously. Receiving positive feedback makes Rep increase only slightly faster. Receiving no feedback at all still contributes to aging off of negative. The calculation of gamer rating is based on the number of strangers played, the number of negative reviews received, the number of positive reviews received, plus additional factors used to control the speed and rate at which gamer rating increases or decreases.

Figure 14:
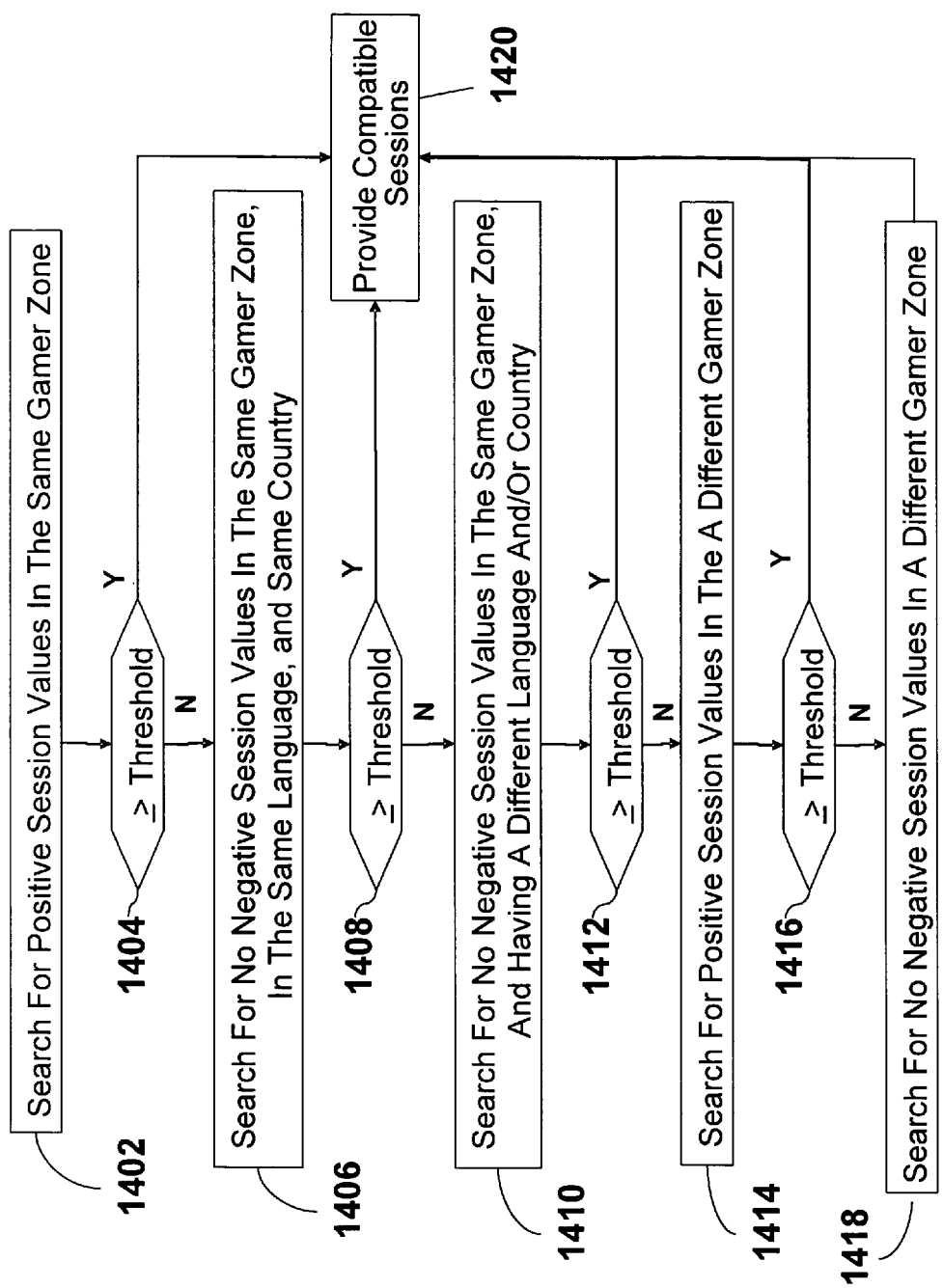
FIG. 14 is a flow diagram of an exemplary process for searching for compatible sessions.

FIG. 14 is a flow diagram of an exemplary process for searching for compatible sessions. Queries, or searches, for compatible sessions are conducted in multiple passes. Results from each pass are accumulated until enough compatible sessions are found. The number of compatible sessions needed (e.g., threshold amount) can be any appropriate number. The threshold number can be predetermined or determined by the user. Sessions with positive session values and occurring in the same gamer zone as the user are searched for in the first pass at step 1402. A positive session value would result, for example, from a session comprising all positive affiliations, such as friends. If a threshold amount of compatible sessions is found (step 1404) as a result of the first pass (step 1402), the compatible sessions are provided to the user at step 1420. If a threshold number of compatible sessions is not found (step 1404), the next pass is performed. Sessions having no negative session values, in the same gamer zone, in the same language, and in the same country are searched for at the next pass (step 1406). A negative session value would result, for example, from a session comprising all negative affiliations, such as avoided players. If a threshold amount of compatible sessions is found (step 1408) as a result of this pass (step 1406), the compatible sessions are provided to the user at step 1420. If a threshold number of compatible sessions is not found (step 1408), the next pass is performed.

Sessions having no negative session values, in the same gamer zone as the user, having a different language and/or country than the user are searched for in the next pass (step 1410). If a threshold amount of compatible sessions is found (step 1412) as a result of this pass (step 1410), the compatible sessions are provided to the user at step 1420. If a threshold number of compatible sessions is not found (step 1412), the next pass is performed. Sessions having positive session values in a different gamer zone than the user are searched for in the next pass (step 1414). Finally, sessions having no negative session values in a different gamer zone than the user are searched for (step 1418). If the multi-pass process gets this far, all found compatible sessions are provided to the user at step 1420.

In order to provide a user with an enjoyable game experience, sessions are rated, or valued, according to the types of affiliations in a session. Various types of affiliations between players are analyzed. FIG. 15 is a list of exemplary affiliations. Affiliation types include: the user adding a person to the user's friend list (referred to as a "Friend" affiliation), the user submitting positive feedback/comments about a person (referred to as a "Positive Feedback" affiliation), the user previously having completed a game with a person (referred to as a "Completed Game" affiliation), the user having submitted negative feedback/comments about a person (referred to as a "Negative Feedback" affiliation), and a person having submitted negative feedback/comments about the user (referred to as an "Avoiding Me" affiliation).

A session is assigned a value utilizing the various types of affiliations associated with the session. In an exemplary social matching model the following criteria are applied: a session with one Friend and several strangers is better than a session with one Positive Feedback and several strangers, a session with one Positive Feedback and several strangers is better than a session with one Completed Game and several strangers, a session with one Completed Game and several strangers is better than a session with only strangers, a session with one Negative Feedback is worse than a session with only strangers, and a session with one Avoiding Me is worse than a session with only strangers. In this exemplary social matching model, a user is not precluded from joining a session having a Negative Feedback or an Avoiding affiliation. It is acceptable for a user to be matched into a session that contains people that the user has submitted negative feedback on, or people who have submitted negative feedback about the user. It is preferred that the "good" outweighs the "bad".

FIG. 16 is a depiction of an exemplary formula for determining a session value. A session is assigned a value in accordance with a weighted combination of session affiliations. An example of a weighted combination of session affiliations meeting the above criteria is a weighted sum of session affiliations. Note that a summation is exemplary and other combinations can be used, such as a nonlinear combination (e.g., square function). The following formula, as depicted in FIG. 16, is an exemplary weighted summation of session affiliations:

$$\text{Session Value} = \\ (W1)*(\text{Number of Friends}) + (W2)*(\text{Number of Positive Feedback}) + \\ (W3)*(\text{Number of Completed Games}) - \\ (W4)*(\text{Number of Negative Feedback}) - \\ (W5)*(\text{Number of Avoiding Me})$$

If the calculation of a session value results in a positive value, the session value is a positive session value. If the calculation of a session value results in a negative value, the session value is a negative session value. An exemplary set of values for the weights is: $W1=4$, $W2=2$, $W3=1$, $W4=3$, and $W5=3$. This set of weights is exemplary, and can be modified to accommodate a variety of scenarios.

Negative affiliations do not prevent a player from being matched with a session. That is, it is possible for a user to be matched into a session that contains people who have submitted negative feedback about the user, or people about whom the user has submitted negative feedback. Also, it is possible for a user to be affiliated with another user in more than one way. For example, the first time user A completes a game with user B, user B will be added as a Completed Game affiliate of user A and user A will be added as a Completed Game affiliate of user B. Further, affiliations can be one-way or two-way. For example, the completed game affiliation is two-way. If user A and user B complete the same game, each will be added to the other's completed game affiliation list. And, as another example, the positive affiliation is one-way. If user A submits positive feedback about user B, user B is on user A's positive affiliation list, but user A is not on user B's positive affiliation list. If a user has multiple affiliations, each affiliation is considered independently for calculating a session value.

While social matching of game players on-line has been described in connection with the illustrative embodiments of the various Figures, it is to be understood that other similar embodiments may be used or modifications and additions may be made to the described embodiment for performing the same function of social matching of game players on-line without deviating therefrom. Rather, the specific features and acts described above are disclosed as example forms of implementing the claims. Therefore, methods and apparatuses for social matching of game players on-line should not be limited to any single embodiment, but rather should be construed in breadth and scope in accordance with the appended claims.

What is claimed is:

1. A method comprising:
receiving, by a server, a request to provide to a gaming device, a compatible game session that is compatible with a first type of game, the gaming device being associated with a first player;
determining, by the server, a session value of a game session by combining attributes of multiple game players participating in the game session, the attributes comprising:
cross-game data collected across various types of games including the first type of game;
a social rating of a game player of the multiple game players; and
a weighted combination of parameters;
determining, by the server, if the session value exceeds a threshold value;
upon a determination that the session value exceeds the threshold value, determining, by the server, that the game session is compatible with the first game type; and
providing, by the server, the game session.

2. The method of claim 1, the attributes further comprising at least one of:
a social rating of a second player hosting the game session;
a gamer zone indicating a range of socially acceptable game sessions;
a gamer zone selected by the first player operating as a host player;
a country; or
a language.

3. The method of claim 1, the cross-game data further comprising at least one of:
an affiliation indicative of a second player having submitted positive comments about a third player, the second player belonging to a friend list of the third player;
an affiliation indicative of the second player having previously completed a game session with the third player;
an affiliation indicative of the second player having submitted negative comments about the third player; or
an affiliation indicative of the third player having submitted negative comments about the second player.

4. The method of claim 1, wherein the threshold value is one of predetermined or selected.

5. The method of claim 1, the weighted combination of parameters comprising a summation of:
a first weight times a number of players in the game session having been added to a friend list of the first player;
a second weight times a number of players in the game session having submitted positive comments about the first player;
a third weight times a number of players in the game session having previously completed a game session with the first player;
a fourth weight times a number of players in the game session about which the first player has submitted negative comments; and
a fifth weight times a number of players in the game session having submitted negative comments about the first player.

6. The method of claim 1, further comprising:
determining, by a server, that a game session comprising one player having been added to a friends list of the first player and comprising several players having no affiliations is more compatible than a second game session comprising one player having submitted positive comments about the first player and further comprising several players having no affiliations.

7. A computer-readable storage medium that is not a transient signal, the computer-readable storage comprising executable instructions that when executed by a processor cause the processor to effectuate operations comprising:
receiving a request to provide to a gaming device, a compatible game session that is compatible with a first type of game, the gaming device being associated with a first player;
determining a session value of a game session by combining attributes of multiple game players participating in the game session, the attributes comprising:
cross-game data collected across various types of games including the first type of game;
a social rating of a game player of the multiple game players; and
a weighted combination of parameters;
determining if the session value exceeds a threshold value;
upon a determination that the session value exceeds the threshold value, determining that the game session is compatible with the first game type; and
providing the game session.

8. The computer-readable storage medium of claim 7, the attributes further comprising at least one of:
a social rating of a second player hosting the game session;
a gamer zone selected by the first player, the gamer zone indicating a range of socially acceptable game sessions;
a gamer zone selected by the first player operating as a host player;
a country; or
a language.

9. The computer-readable storage medium of claim 7, wherein the threshold value is one of predetermined or selected.

10. The computer-readable storage medium of claim 7, the attributes further comprising at least one of:
a social rating of a second player hosting the game session;
a gamer zone indicating a range of socially acceptable game sessions;
a gamer zone selected by the first player operating as a host player;
a country; and
a language.

11. The computer-readable storage medium of claim 7, the cross-game data further comprising at least one of:
an affiliation indicative of a second player having submitted positive comments about a third player, the second player belonging to a friend list of the third player;
an affiliation indicative of the second player having previously completed a game session with the third player;
an affiliation indicative of the second player having submitted negative comments about the third player; or
an affiliation indicative of the third player having submitted negative comments about the second player.

12. The computer-readable storage medium of claim 7, the weighted combination of parameters comprising a summation of:
a first weight times a number of players in the game session having been added to a friend list of said first player;

a second weight times a number of players in the game session having submitted positive comments about said first player;

a third weight times a number of players in the game session having previously completed a game session with said first player;

a fourth weight times a number of players in the game session about which said first player has submitted negative comments; and a fifth weight times a number of players in the game session having submitted negative comments about the first player.

13. The computer-readable storage medium of claim 7, the operations further comprising:

determining that a first game session comprising one player having been added to a friends list of said first player and comprising several players having no affiliations is more compatible than a second game session comprising one player having submitted positive comments about said first player and further comprising several players having no affiliations.

14. The apparatus of claim 7, the operations further comprising:

determining that a first game session comprising one player having been added to a friends list of said first player and comprising several players having no affiliations is more compatible than a second game session comprising one player having submitted positive comments about said first player and further comprising several players having no affiliations.

15. An apparatus comprising:

a processor; and memory coupled to the processor, the memory comprising executable instructions that when executed by the processor cause the processor to effectuate operations comprising:

receiving a request to provide to a gaming device, a compatible game session that is compatible with a first type of game, the gaming device being associated with a first player;

determining session value of a game session by combining attributes of multiple game players participating in the game session, the attributes comprising:

cross-game data collected across various types of games including the first type of game;

a social rating of a game player of the multiple game players; and a weighted combination of parameters;

determining if the session value exceeds a threshold value;

upon a determination that the session value exceeds the threshold value, determining that the game session is compatible with the first game type; and providing the game session.

16. The apparatus of claim 15, the attributes further comprising at least one of:

a social rating of a second player hosting the game session;

a gamer zone selected by the first player, the gamer zone indicating a range of socially acceptable game sessions;

a gamer zone selected by the first player operating as a host player;

a country; or a language.

17. The apparatus of claim 15, the weighted combination of parameters comprising a summation of:

a first weight times a number of players in the game session that have previously completed a game session with the first player; and a second weight times a number of players in the game session about which the first player has submitted negative comments.

18. The apparatus of claim 15, the attributes further comprising at least one of:

a social rating of a second player hosting the game session;

a gamer zone indicating a range of socially acceptable game sessions;

a gamer zone selected by the first player operating as a host player;

a country; and a language.

* * * * *